United States Patent
Lee et al.

(10) Patent No.: US 9,685,821 B2
(45) Date of Patent: Jun. 20, 2017

(54) UNINTERRUPTABLE DC POWER SUPPLY PROVIDING SEAMLESS DC POWER TO LOAD

(71) Applicant: Jae Jin Lee, Chungcheongbuk-do (KR)

(72) Inventors: Jae Jin Lee, Chungcheongbuk-do (KR); Kyo Beum Lee, Gyeonggi-do (KR)

(73) Assignee: Jae Jin Lee, Chungcheongbuk-Do (KR)

( * ) Notice: Subject to any disclaimer, the term of this patent is extended or adjusted under 35 U.S.C. 154(b) by 189 days.

(21) Appl. No.: 14/435,532

(22) PCT Filed: Oct. 8, 2013

(86) PCT No.: PCT/KR2013/008979
§ 371 (c)(1),
(2) Date: Apr. 14, 2015

(87) PCT Pub. No.: WO2014/061933
PCT Pub. Date: Apr. 24, 2014

(65) Prior Publication Data
US 2016/0006297 A1    Jan. 7, 2016

(30) Foreign Application Priority Data
Oct. 15, 2012  (KR) .......................... 10-2012-0114342

(51) Int. Cl.
*H02J 9/00* (2006.01)
*H02J 9/06* (2006.01)
*H02J 7/00* (2006.01)

(52) U.S. Cl.
CPC ............ *H02J 9/061* (2013.01); *H02J 7/0068* (2013.01)

(58) Field of Classification Search
CPC ................................ H02J 7/0068; H02J 9/061
(Continued)

(56) References Cited

U.S. PATENT DOCUMENTS 6,445,088 B1 * 9/2002 Spitaels .................. H02J 9/061
307/66

FOREIGN PATENT DOCUMENTS

KR    20-0186662    4/2000    ............. H02M 7/00
KR    200186662    *  4/2000   ............. H02M 7/00
(Continued)

OTHER PUBLICATIONS

International Search Report (ISR) dated Jan. 7, 2014 in PCT/KR2013/008979 with English translation.

*Primary Examiner* — Jared Fureman
*Assistant Examiner* — Duc M Pham
(74) *Attorney, Agent, or Firm* — Harness, Dickey & Pierce, P.L.C.

(57) ABSTRACT

Provided is an uninterruptible direct current (DC) power supply system, which includes a first connection unit electrically connected to a DC power conversion system which converts prevailing AC power into the DC power, a second connection unit which is electrically connected to the load and supplies the DC power to the load, an auxiliary power supply charged by the DC power, and an uninterruptible control unit which supplies the DC power supplied from the DC power conversion system normally connected to the first connection unit to the load through the second connection unit, charges the auxiliary power supply, and controls power to be continuously supplied to the load while perfectly cutting off electrical connection between the DC power conversion system and the auxiliary power supply when the DC power conversion system is disconnected from the first connection unit, is damaged, or short-circuits.

10 Claims, 3 Drawing Sheets

(58) Field of Classification Search
USPC .......................................................... 307/64
See application file for complete search history.

(56) References Cited

FOREIGN PATENT DOCUMENTS

| KR | 20070106912 | * | 5/2006 | ............. H01R 13/70 |
| KR | 10-2007-0106912 | | 11/2007 | ............. H01R 13/70 |
| KR | 10-0778892 | | 11/2007 | ................ H02J 9/06 |
| KR | 10-2008-0101973 | | 11/2008 | ............... H02G 9/06 |
| KR | 10-2010-0068759 | | 6/2010 | ............. H02M 1/42 |

* cited by examiner

UNINTERRUPTABLE DC POWER SUPPLY PROVIDING SEAMLESS DC POWER TO LOAD

CROSS-REFERENCE TO RELATED APPLICATIONS

This application is a national phase application of PCT Application No. PCT/KR2013/008979, filed on 8 Oct. 2013, which claims benefit of Korean Patent Application 10-2012-0114342, filed on 15 Oct. 2012. The entire disclosure of the application identified in this paragraph is incorporated herein by reference.

TECHNICAL FIELD

The present invention relates to an uninterruptible direct current (DC) power supply system, and more particularly, to an uninterruptible DC power supply system which is connected to a DC power conversion system converting prevailing alternating current (AC) power into DC power, supplies the DC power to a load, charges an internal auxiliary power supply with the DC power, and continuously supplies power to the load from the auxiliary power supply while cutting an electric connection with the DC power conversion system when the DC power conversion system short-circuits due to a leakage current or damage thereof or is disconnected.

BACKGROUND

Interruptible power supply systems are apparatuses which generally provide power generated by a battery or an additional auxiliary power supply to a load in case of emergency such as a power outage. Since an uninterruptible power supply system is allowed to operate in the event of a power outage and an auxiliary power supply supplies power for several seconds to several hours, electric installations of a load are protected and electric installations normally operate.

Such uninterruptible power supply system include a central processing unit (CPU) which controls operations of converting prevailing alternating current (AC) power into direct current (DC) power to charge an auxiliary power supply such as a battery, converting DC power of the auxiliary power supply into AC power to be supplied to a load in the event of an electric discharge, and converting the DC power of the auxiliary power supply into AC power when a power outage is sensed.

However, the CPU may malfunction due to electromagnetic waves and may wrongly determine as a power outage occurs when it does not occur due to a disorder in hardware of the CPU or an error or disorder in software such as an error in a control program of the CPU. Accordingly, the CPU allows DC power of an auxiliary power supply to be converted into AC power, thereby generating a discharge of the auxiliary power supply even though a power outage does not occur.

Also, after a power outage actually occurs, since the DC power of the auxiliary power supply is not converted into AC power before the CPU determines the occurrence of the power outage and begins controlling the conversion of the power of the auxiliary power supply. Accordingly, for example, when the load is one of a network server, a hub forming a local area network (LAN), an L2 switch, and an access point, it is impossible to normally perform network communication. Also, when the load is a closed-circuit television (CCTV) camera forming a security system, since security surveillance is not normally performed, unexpected damages may occur to users.

Also, a configuration of a circuit for converting prevailing AC power into DC power to charge the auxiliary power supply and the converting DC power of the auxiliary power supply into AC power to supply power to the load becomes complicated.

As a cited reference, there is Korean Patent Registration No. 10-0778892 (registered in Nov. 16, 2007).

SUMMARY

It is an aspect of the present invention to provide an uninterruptible DC power supply system which is connected to a DC power conversion system converting prevailing alternating current (AC) power into DC power, supplies the DC power to a load, charges an internal auxiliary power supply with the DC power, and continuously supplies power to the load from the auxiliary power supply while cutting an electric connection with the DC power conversion system when the DC power conversion system short-circuits due to a leakage current or damage thereof or is disconnected.

It is another aspect of the present invention to provide an uninterruptible DC power supply system which allows power conversion and power supply to be performed without control of a central processing unit (CPU).

Aspects of the present invention are not limited thereto and additional aspects of the invention will be obvious to one of ordinary skill in the art from the following description.

According to an aspect of the present invention, there is provided an uninterruptible direct current (DC) power supply system which continuously supplies DC power to a load. The uninterruptible DC power supply system includes a first connection unit electrically connected to a DC power conversion system which converts prevailing AC power into the DC power, a second connection unit which is electrically connected to the load and supplies the DC power to the load, an auxiliary power supply charged by the DC power, and an uninterruptible control unit which supplies the DC power supplied from the DC power conversion system normally connected to the first connection unit to the load through the second connection unit, charges the auxiliary power supply, and controls power to be continuously supplied to the load while perfectly cutting off electrical connection between the DC power conversion system and the auxiliary power supply when the DC power conversion system is disconnected from the first connection unit, is damaged, or short-circuits.

The uninterruptible control unit may include a connection controller which includes a relay connected to the first connection unit and controls connection between the first connection unit and the relay to be cut off by changing the relay into a reset latch state when the DC power conversion system is disconnected from the first connection unit, is damaged, or short-circuits and controls the first connection unit and the relay to be connected to each other by changing the relay into a set latch state when the DC power conversion system is normally connected to the first connection unit, a boosting transformer which boosts a level of DC voltage power supplied from the DC power conversion system normally connected to the first connection unit and changes the auxiliary power supply using the boosted DC voltage power, a step-down transformer which steps down a level of voltage power of the auxiliary power supply, and a power supply controller including a current sensor which outputs sensor voltages at different levels depending on whether current power is applied from the step-down transformer and applies voltage power output from the step-down transformer to the load connected to the second connection unit as the current power is applied from the step-down transformer and a comparator which controls the reset latch state of the relay by controlling an output of the voltage power output from the step-down transformer according to the sensor voltages at different levels.

The current sensor may output a first sensor voltage when the current power is applied from the step-down transformer and may output a second sensor voltage smaller than the first sensor voltage when the current power is not applied. Also, the comparator may allow the relay to be in the reset latch state by applying the voltage power output from the step-down transformer to the relay when the first sensor voltage is applied and may prevent the relay from being in the reset latch state not by applying the voltage power output from the step-down transformer to the relay when the second sensor voltage is applied.

The current sensor may be a hall sensor.

The level of the DC voltage power supplied from the DC power conversion system normally connected to the first connection unit may be about 12 V, the level of the boosted DC voltage power may be about 16.8 V, and the level of the stepped down voltage power may be about 12.4 V.

A case in which the DC power conversion system is normally connected to the first connection unit may indicate a state in which the DC power normally output from the DC power conversion system is supplied to the first connection unit.

A state in which the DC power conversion system is disconnected from the first connection unit may indicate a state in which the DC power conversion system is disconnected from the first connection unit and the DC power normally output from the DC power conversion system is not supplied to the first connection unit.

A state in which the DC power conversion system is damaged may indicate a state in which the DC power conversion system does not work and the DC power is not normally output.

A state in which the DC power conversion system short-circuits may indicate a state in which an anode and a cathode of the DC power conversion system short-circuit.

The uninterruptible control unit may further include a switch which is connected to the auxiliary power supply connected to the step-down transformer and controls connection between the step-down transformer and the auxiliary power supply.

Advantageous Effects

As is apparent from the above description, an uninterruptible DC power supply system in accordance with one embodiment of the present invention is connected to a DC power conversion system converting prevailing alternating current (AC) power into DC power, supplies the DC power to a load, charges an internal auxiliary power supply with the DC power, and continuously supplies power to the load from the auxiliary power supply while cutting an electric connection with the DC power conversion system when the DC power conversion system short-circuits due to a leakage current or damage thereof or is disconnected.

Also, it is possible to prevent a phenomenon, in which power of an auxiliary power supply is discharged when a power outage does not occur, which may occur due to a malfunction of the CPU due to electromagnetic waves, a disorder in a hardware configuration of the CPU, and an error in software such as a control program.

Also, since it is unnecessary to convert AC power into DC power to charge an auxiliary power supply such as a battery and to convert DC power of the auxiliary power supply into AC power to supply it to a load, a circuit configuration of the uninterruptible DC power supply system becomes simplified.

DRAWINGS

DETAILED DESCRIPTION

Figure 1:
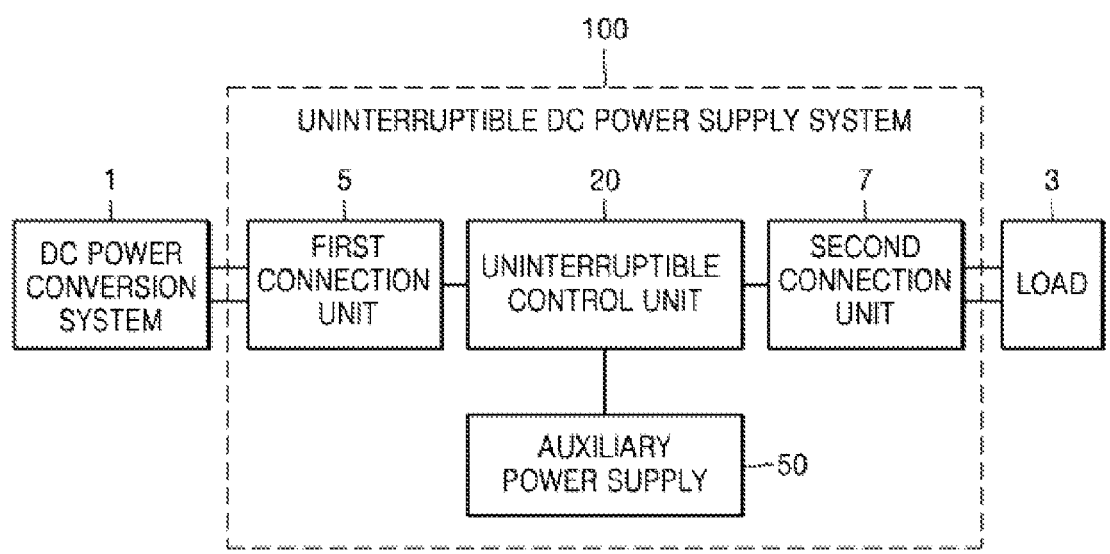
FIG. 1 is a configuration view of an uninterruptible direct current (DC) power supply system which continuously supplies DC power to a load according to an embodiment of the present invention.

Hereinafter, exemplary embodiments of the present invention will be described in detail with reference to the attached drawings.

The embodiments of the present invention are provided to more perfectly explain the inventive concept to one of ordinary skill in the art. The following embodiments may be changed into various other forms, and the scope of the inventive concept is not limited thereto. The embodiments are provided to allow the present disclosure to be more perfect and to fully transfer the inventive concept to one of ordinary skill in the art.

The terms are used herein to describe particular embodiments but will not to limit the present invention. As used herein, singular expressions, unless defined otherwise in contexts, include plural expressions. It will be further understood that the terms "comprises" and/or "comprising" used herein specify the presence of stated shapes, numbers, operations, elements, and/or groups thereof, but do not preclude the presence or addition of one or more other shapes, numbers, operations, elements, and/or groups thereof. As used herein, the term "and/or" includes any and all combinations of one or more of the associated listed items.

It will be understood that although the terms "first," "second", etc. may be used herein to describe various components, these components should not be limited by these terms. The terms do not mean a particular order, top and bottom, or merits and demerits but are only used to distinguish one component from another. Accordingly, a first element, area, or portion that will be described below may indicate a second element, area, or portion without deviating from teachings of the present invention.

Hereinafter, the embodiments of the inventive concept will be described with reference to schematic drawings. In the drawings, for example, according to manufacturing technologies and/or tolerances, illustrated shapes may be modified. Accordingly, the embodiments of the present invention will not be understood to be being limited to certain shapes of illustrated areas but will include changes in shape occurring while being manufactured.

Figure 2:
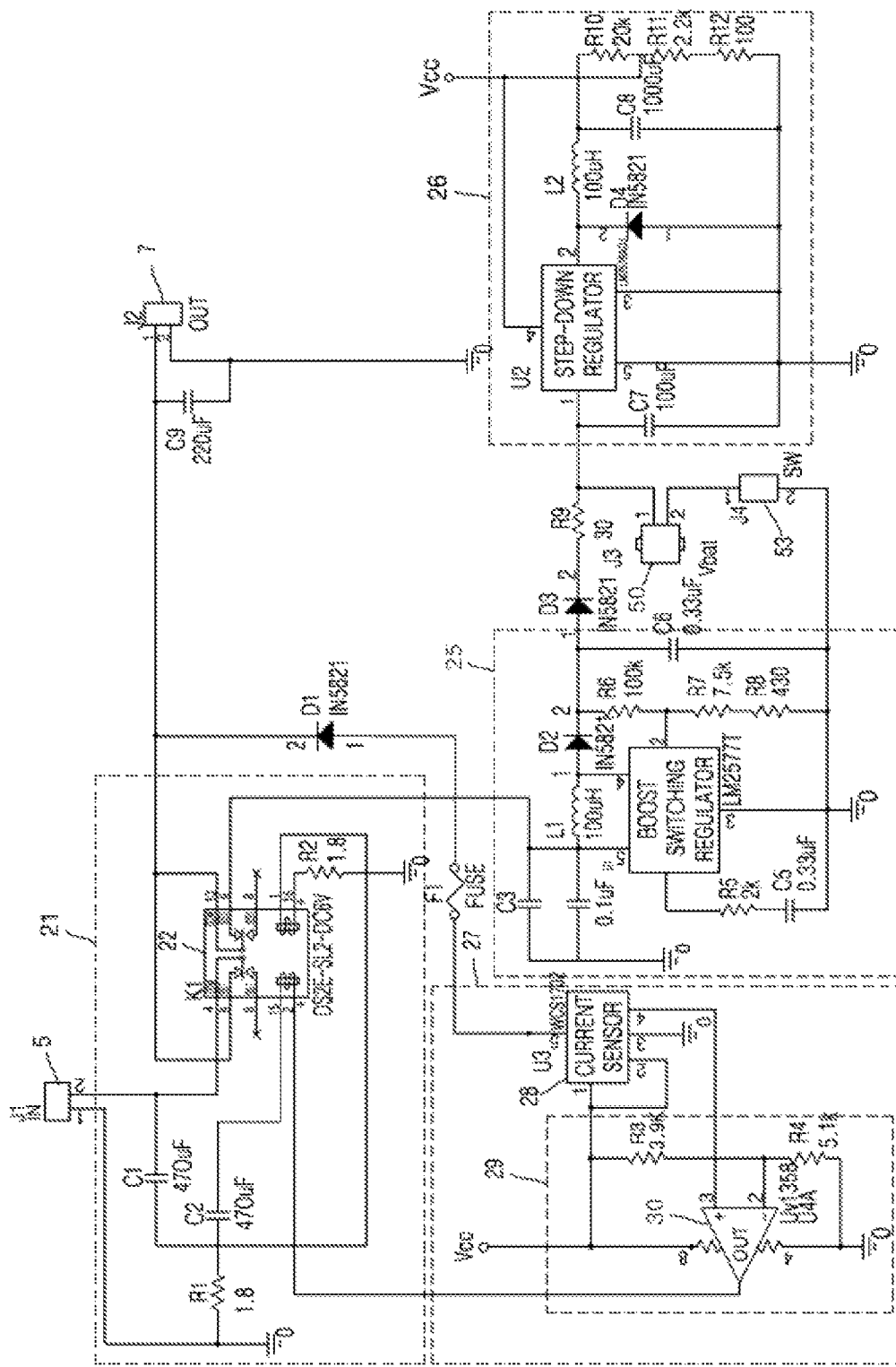
FIG. 2 is a view illustrating an example of the uninterruptible DC power supply system of FIG. 1 which is actually applied.

FIG. 1 is a configuration view of an uninterruptible direct current (DC) power supply system 100 according to an embodiment of the present invention. FIG. 2 is a view illustrating an example of the uninterruptible DC power supply system 100 which is actually applied.

Referring to FIGS. 1 and 2, the uninterruptible DC power supply system 100 includes a first connection unit 5, a second connection unit 7, an uninterruptible control unit 20, and an auxiliary power supply 50.

The first connection unit 5 is electrically connected to a DC power conversion system 1 which converts prevailing alternating current (AC) power into DC power. Herein, the DC conversion system 1 may be an adapter which includes a plug, converts the prevailing AC power into the DC power, and supplies the DC power to the first connection unit 5 through the plug. Hereupon, the first connection unit 5 may be a plug socket into which the plug of the adapter is inserted. It will be understood that the term power used throughout the specification has a concept including current power and voltage power. For example, DC power output from the DC power conversion system 1 includes DC current power and DC voltage power.

The second connection unit 7 is electrically connected to a load 3 and supplies the DC power supplied from the DC power conversion system 1 to the load 3. Herein, the load 3 may be a device which includes a plug and consumes the DC power supplied from the DC power conversion system 1, such as a closed-circuit television (CCTV) camera, a hub, an L2 switch, and an access point. Accordingly, the second connection unit 7 may be a plug socket into which the plug of the load 3 is inserted.

The auxiliary power supply 50 is charged with the DC power supplied from the DC power conversion system 1.

The uninterruptible control unit 20 controls the DC power supplied from the DC power conversion system 1 normally connected to the first connection unit 5 to be supplied to the load 3 through the second connection unit 3, to charge the auxiliary power supply 50, and to continuously supply power to the load 3 while perfectly cut off electric connection between the DC power conversion system 1 and the auxiliary power supply 50 when the DC power conversion system 1 is disconnected from the first connection unit 5, is damaged, or short-circuits.

Herein, a case in which the DC power conversion system 1 is normally connected to the first connection unit 5 indicates a state in which the DC power normally output from the DC power conversion system 1 is supplied to the auxiliary power supply 50 through the first connection unit 5.

Also, a state in which the DC power conversion system 1 is disconnected from the first connection unit 5 indicates a state in which the DC power conversion system 1 is disconnected from the first connection unit 5 and the DC power normally output from the DC power conversion system 1 is not supplied to the first connection unit 5.

Also, a state in which the DC power conversion system 1 is damaged indicates a state in which the DC power conversion system 1 does not work and the DC power is not normally output.

Also, a state in which the DC power conversion system 1 short-circuits indicates a state in which an anode and cathode of the DC power conversion system 1 short-circuit.

The uninterruptible control unit 20, referring to FIG. 2, includes a connection controller 21, a boosting transformer 25, a step-down transformer 26, and a power supply controller 27.

The connection controller 21 includes a relay 22 connected to the first connection unit 5 and allows the relay 22 to be in a reset latch state to cut off connection between the first connection unit 5 and the relay 22 when the DC power conversion system 1 is disconnected from the first connection unit 5, is damaged, or short-circuits. When the DC power conversion system 1 is normally connected to the first connection unit 5, the connection controller 21 controls the relay 22 to be in a set latch state to connect the first connection unit 5 with the relay 22.

The connection controller 21 includes the relay 22, capacitors C1 and C2, and resistors R1 and R2.

A connection of the relay 22 will be described. A fourth terminal COM of the relay 22 electrically connects a second terminal of the first connection unit 5 with a first switch 22a. An eighth terminal SET of the relay 22 is electrically connected with or disconnected from one of a first terminal of the second connection unit 7 and a third terminal COM of the relay 22 depending on whether being in electric contact with the first switch 22a or not. A sixth terminal RST of the relay 22 is electrically connected to the second terminal of the first connection unit 5 or exposed to the air depending on whether being in electric contact with the first switch 22a or not. A fifteenth terminal of the relay 22 electrically connects the capacitor C2 with an output of a first coil 22c. A second terminal of the relay 22 electrically connects an input of the first coil 22c with an output terminal OUT of an operational amplifier 30 of the power supply controller 27 which will be described below. A thirteenth terminal COM of the relay 22 electrically connects the eighth terminal and the first terminal of the second connection unit 7 with a second switch 22b. A ninth terminal SET of the relay 22 is electrically connected to or disconnected from the boosting transformer 25 that will be described below, depending on whether being in electric contact with the second switch 22b or not. An eleventh terminal RST of the relay 22 electrically connects or disconnects the eighth terminal of the relay 22 with or from the first terminal of the second connection unit 7 depending on whether being in electric contact with the second switch 22b or not. A first terminal of the relay 22 electrically connects the capacitor C1 with an input of a second coil 22d. A sixteenth terminal of the relay 22 electrically connects the second coil 22d with a ground through the resistor R2. That is, the sixteenth terminal of the relay 22 is connected to the ground through the resistor R2.

One end of the capacitor C1 of the connection controller 21 is electrically connected to the second terminal of the first connection unit 5 and the fourth terminal COM of the relay 22 and another end of the capacitor C1 is electrically connected to the first terminal of the relay 22.

One end of the capacitor C2 of the connection controller 21 is electrically connected to the fifteenth terminal of the relay 22 and another end of the capacitor C2 is electrically connected to the resistor R1.

One end of the resistor R1 of the connection controller 21 is electrically connected to the other end of the capacitor C2 and another end of the resistor R1 is electrically connected to the ground.

One end of the resistor R2 of the connection controller 21 is electrically connected to the sixteenth terminal of the relay 22 and another end of the resistor R2 is electrically connected to the ground.

The boosting transformer 25 boosts a level of DC voltage power supplied from the DC power conversion system 1 normally connected to the first connection unit 5 and charges the auxiliary power supply 50 with the boosted DC voltage power. The boosting transformer 25 includes capacitors C2, C4, C5, and C6, an inductor L1, resistors R5, R6, R7, and R8, a diode D2, and a boosting switching regulator. Connection therebetween are as below. When the level of the DC voltage power supplied from the DC power conversion system 1 is 12 V, the boosting transformer 25 boosts the DC voltage power of 12 V to output voltage capable of fully charging the auxiliary power supply 50.

When one end of the capacitor C3 is electrically connected to the ninth terminal SET of the relay 22 and a fifth terminal of the boosting switching regulator, another end thereof is electrically connected to the ground.

One end of the capacitor C4 is electrically connected to the ninth terminal SET of the relay 22, the fifth terminal of the boosting switching regulator, and the inductor L1 and another end thereof is electrically connected to the ground.

One end of the inductor L1 is electrically connected to the one end of the capacitor C3, the one end of the capacitor C4, the ninth terminal SET of the relay 22, and the fifth terminal of the boosting switching regulator and another end thereof is electrically connected to a fourth terminal of the boosting switching regulator and the diode D2.

One end of the diode D2 is electrically connected to the fourth terminal of the boosting switching regulator and the other end of the inductor L1 and another end thereof is electrically connected to the resistor R6 and a diode D3.

One end of the resistor R6 is electrically connected to the other end of the diode D2 and the diode D3 and another end thereof is electrically connected to a second terminal of the boosting switching regulator and the resistor R7.

One end of the resistor R7 is electrically connected to the second terminal of the boosting switching regulator and the other end of the resistor R6 and another end thereof is connected to the resistor R8 in series.

One end of the resistor R8 is electrically connected to the other end of the resistor R7 and another end thereof is electrically connected to the ground.

One end of the resistor R5 is electrically connected to a first terminal of the boosting switching regulator and another end thereof is electrically connected to the capacitor C5.

One end of the capacitor C5 is electrically connected to the other end of the resistor R5 and another end thereof is electrically connected to the ground.

A third terminal of the boosting switching regulator is electrically connected to the ground.

The boosting switching regulator is embodied using LM2577T of National Semiconductor but is not limited thereto.

An output voltage of the boosting switching regulator is determined a ratio of the resistor R6 to (the resistor R7+the resistor R8). Due to switching according to the oscillation of the inductor L1, the capacitor C5, and the diode D2, the boosting switching regulator increases and applies voltage to a schottky diode D3. Using voltage of about 16.8 V boosted through the schottky diode D3, the auxiliary power supply 50 is being charged to a full charge voltage of the auxiliary power supply 50, for example, about 16.8 V when the auxiliary power supply 50 is formed of four lithium-ion batteries with full charge voltages of 4.2 V and discharge reference voltages of 3.4 V. On the other hand, the resistor R9 limits currents to prevent at most 100 mA currents from flowing from the auxiliary power supply 50 to the boosting transformer 25 when the auxiliary power supply 50 is perfectly discharged, for example, at 13.6 when the auxiliary power supply 50 is formed of the four lithium-ion batteries.

The step-down transformer 26 steps down a level of voltage power of the auxiliary power supply 50 and supplies the stepped down voltage power to the power supply controller 27. The step-down transformer 26 includes capacitors C7 and C8, a step-down switching regulator, a diode D4, an inductor L2, and resistors R10, R11, and R12. Connection therebetween are as below. The step-down transformer 26 steps down a level of the power of the auxiliary power supply 50, which is 16.8 V, and outputs 12.4 V.

One end of the capacitor C7 is electrically connected to a first terminal of the auxiliary power supply 5 and a first terminal of the step-down switching regulator and another end thereof is electrically connected to the ground.

One end of the diode D4 is electrically connected to the ground and another end thereof is electrically connected to a second terminal of the step-down switching regulator and the inductor L2.

One end of the inductor L2 is electrically connected to the second terminal of the step-down switching regulator and the other end of the diode D4 and another end thereof is electrically connected to the capacitor C8 and the resistor 10.

One end of the capacitor C8 is electrically connected to the other end of the inductor L2 and the resistor R10 and another end thereof is electrically connected to the ground.

One end of the resistor R10 is electrically connected to the other end of the inductor L1 and the one end of the capacitor C8 and another end thereof is electrically connected to the resistor R11 and a fourth terminal of the step-down switching regulator.

One end of the resistor R11 is electrically connected to the other end of the resistor R10 and the fourth terminal of the step-down switching regulator and another end thereof is electrically connected to the resistor R12.

One end of the resistor R12 is electrically connected to the other end of the resistor R11 and another end thereof is electrically connected to the ground.

A third terminal and a fifth terminal of the step-down switching regulator are electrically connected to the ground.

The step-down switching regulator is embodied using LM2576ADJ of National Semiconductor but is not limited thereto.

An output voltage of the step-down switching regulator is determined a ratio of the resistor R10 to (the resistor R11+the resistor R12). The step-down switching regulator steps down voltages using the switching of the inductor L1 and the diode D2. An input voltage input to the first terminal of the step-down switching regulator is a voltage of the auxiliary power supply 50 and may vary, for example, within a range of from about 13.6 V to about 16.8 V. When the step-down switching regulator maintains a constant output voltage regardless of fluctuations of the input voltage in an ideal situation, the output voltage of the step-down switching regulator may be determined as about 12.4 V and drops to about 11.9 V when passing through the diode D1 while being applied to the load 3 through the diode D1. As described above, the voltage drops through the D1 to about 11.9 V which is lower than a voltage supplied to the DC power conversion system 1, for example, 12 V. This is for preventing currents flowing from the auxiliary power supply 50 from being discharged through the diode D1 when the DC power conversion system 1 normally operates.

The power supply controller 27 includes a current sensor 28 which outputs sensor voltages at different levels depending whether current power is applied from the step-down transformer 26 and applies voltage power Vcc output from the step-down transformer 26 to the load 3 connected to the second connection unit 7 as the current power is applied from the step-down transformer 26 and a comparator 29 which controls the output of the voltage power Vcc output from the step-down transformer 26 according to the sensor voltages at different levels and controls a reset latch state of the relay 22.

In the current sensor 28, the current power applied from the step-down transformer 26 is input to a first terminal and output from a fifth terminal, the voltage power Vcc output from the step-down transformer 26 is applied to a second terminal, and a third terminal is electrically connected to the ground. The current sensor 28 outputs the sensor voltages at different levels depending on whether the current power from the step-down transformer 26 to the first terminal through a fourth terminal and may be a hall sensor. Here, the current sensor 28 outputs a first sensor voltage when the current power is applied from the step-down transformer 26 and outputs a second sensor voltage lower than the first sensor voltage when the current power is not applied from the step-down transformer 26. For example, when the current power applied from the step-down transformer 26 is input to the first terminal of the current sensor 28 in such a way that currents of 100 mA or more pass through the diode D1 and flow out to the fifth terminal while the voltage power of about 12.4 V output from the step-down transformer 26 is being applied to the current sensor 28, the first sensor voltage of from about 6.3 to about 6.7 V is output from the fourth terminal of the current sensor 28. When there is no current flowing through the diode D1, the second sensor voltage of about 6.2 V may be output from the further terminal of the current sensor 28.

The comparator 29 is formed of a combination of an operational amplifier OP_AMP 30 and resistors R3 and R4.

A non-inverting terminal of the operational amplifier 30 is electrically connected to the fourth terminal of the current sensor 28 and an inverting terminal thereof is electrically connected to a connection node of the resistors R3 and R4. Here, a voltage of the connection node of the resistors R3 and R4 is greater than 6.2 V and may be about 6.3 V. Accordingly, a voltage of about 6.3 V is applied to the non-inverting terminal of the operational amplifier 30. Accordingly, when the first sensor voltage, for example, 6.7 V is output from the fourth terminal of the current sensor 28, since 6.7 V is applied to the non-inverting terminal of the operational amplifier 30, the operational amplifier 30 applies the voltage power Vcc output from the step-down transformer 26, for example, 12.4 V to the second terminal of the relay 22, thereby allowing the relay 22 to be in a reset latch state. Meanwhile, when the second sensor voltage, for example, 6.2 V is output from the fourth terminal of the current sensor 28, since 6.2 V is applied to the non-inverting terminal of the operational amplifier 30, the operational amplifier 30 outputs and applies 0 V to the second terminal of the relay 22, thereby failing to change the relay 22 into the reset latch state.

On the other hand, the uninterruptible control unit 20 is connected to the second terminal of the auxiliary power supply 50 connected to the step-down transformer 26 and may further include a switch 53 which controls connection between the step-down transformer 26 and the auxiliary power supply 50. The switch 53 may be one of a push button switch, a toggle switch, and a paddle switch and may be any switch capable of controlling the connection between the step-down transformer 26 and the auxiliary power supply 60. A reason of providing the uninterruptible control unit 20 with the switch 53 is to prevent the auxiliary power supply 50 from being discharged because basic standby power is consumed by the step-down switching regulator even though the load 3 is not connected to the second connection unit 7.

Operations of the uninterruptible DC power supply system 100 having the configuration shown in FIGS. 1 and 2 will be described with reference to FIG. 3.

Figure 3:
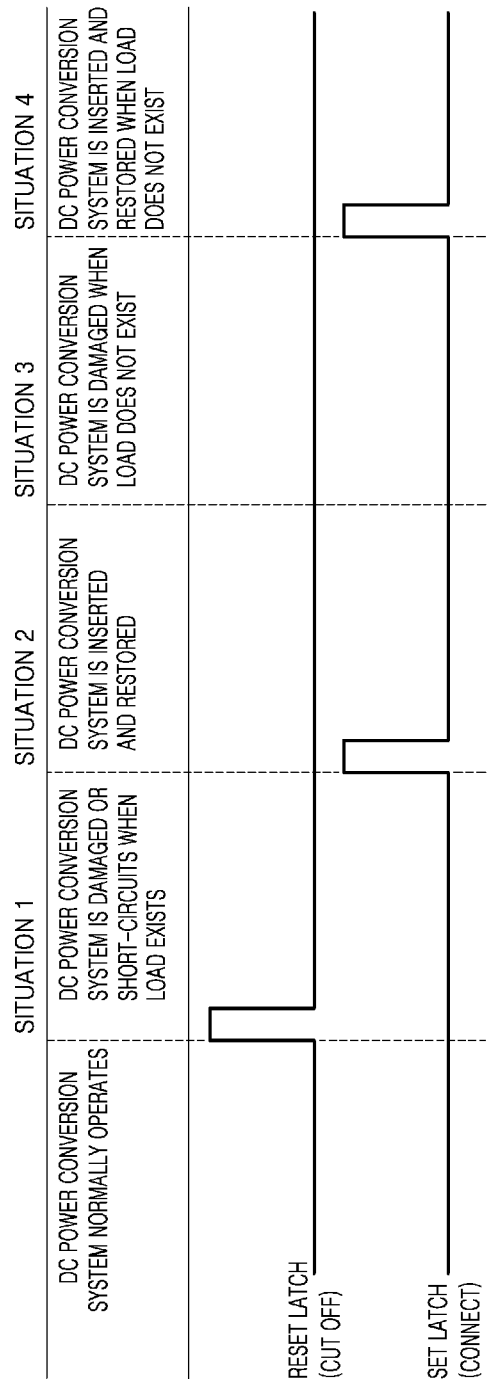
FIG. 3 is a view illustrating a relay operation state of the uninterruptible DC power supply system according to situations which occur depending on a state of a DC power conversion system and a load connection state.

FIG. 3 is a view illustrating a relay operation state of the uninterruptible DC power supply system 100 according to situations which occur depending on a state of the DC power conversion system 1 and a load connection state.

Referring to FIG. 3, when the DC power conversion system 1 normally operates, that is, when DC power is supplied from the DC power conversion system 1 through the first connection unit 5, the relay 22 maintains a set latch state in such a way that the DC power supplied from the DC power conversion system 1 is supplied to the load 3 through the second connection unit 7 and simultaneously with being boosted by the boosting transformer 25 and charging the auxiliary power supply 50. Since a charging operation occurs and a discharge operation does not occur in the auxiliary power supply 50, current power and voltage power Vcc output from the step-down transformer 26 do not occur. Accordingly, since there is no current power passing through the current sensor 28, the current sensor 28 outputs and applies the second sensor voltage, for example, 6.2 V to the non-inverting terminal of the operational amplifier 30 through the fourth terminal. Due to this, since the operational amplifier 30 outputs 0 V to the second terminal of the relay 22, it is impossible to change the relay 22 from the set latch state into the reset latch state. As a result, when the DC power conversion system 1 normally operates, the DC power supplied from the DC power conversion system 1 is supplied to the load 3 and the auxiliary power supply 50.

In the case of a situation 1, that is, when the DC power conversion system 1 is damaged or short-circuits while the load 3 is being connected to the second connection unit 7, since the DC power is not supplied from the DC power conversion system 1 through the first connection unit 5, the DC power is not supplied to the load 3 and the auxiliary power supply 50. Accordingly, a discharge of the auxiliary power supply 50 begins and the step-down transformer 26 steps down a power level, for example, of about 16.8 V of the auxiliary power supply 50 and applies stepped down voltage power Vcc, for example, 12.4 V and current power to the current sensor 28 and the comparator 29 of the voltage supply controller 27. As the current power and voltage power are applied from the step-down transformer 26, the current sensor 28 applies the first sensor voltage, for example, of about 6.7 V to the non-inverting terminal of the operational amplifier 30 through the fourth terminal and outputs the voltage power output from the step-down transformer 26 through the fifth terminal. The voltage power output through the fifth terminal of the current sensor 28 is applied to the load 3 through the diode D1. On the other hand, as the first sensor voltage is applied to the non-inverting terminal, the operational amplifier 30 outputs and applies the voltage power output from the step-down transformer 26 to the second terminal of the relay 22. Accordingly, the relay 22 is changed into a reset latch state. Accordingly, connection between the DC power conversion system 1 and the auxiliary power supply 50 is perfectly cut off.

Also, in a situation 2, when the DC power conversion system 1 is inserted and restored from the situation 1, that is, since the DC power is supplied from the DC power conversion system 1 through the first connection unit 5, instantaneous currents are supplied to the capacitor C1 and the DC power, for example, of about 12 V is instantaneously supplied from the DC power conversion system 1 to the first terminal of the relay 22, thereby changing the relay 22 to be in a set latch state. Due to this, the DC power supplied from the DC power conversion system 1 is supplied to the load 3 through the second connection unit 7 and simultaneously with being boosted by the boosting transformer 25 and charging the auxiliary power supply 50. Since a charging operation occurs and a discharge operation does not occur in the auxiliary power supply 50, current power and voltage power Vcc output from the step-down transformer 26 do not occur. Accordingly, since there is no current power applied to the current sensor 28, the current sensor 28 outputs and applies the second sensor voltage, for example, 6.2 V to the non-inverting terminal of the operational amplifier 30 through the fourth terminal. Due to this, since the operational amplifier 30 outputs 0 V to the second terminal of the relay 22, it is impossible to change the relay 22 from the set latch state into the reset latch state. As a result, when the DC power conversion system 1 normally operates, the DC power supplied from the DC power conversion system 1 is supplied to the load 3 and the auxiliary power supply 50.

In the case of a situation 3, that is, when the DC power conversion system 1 is damaged or short-circuits while the load 3 is not connected to the second connection unit 7, since the DC power is not supplied from the DC power conversion system 1 through the first connection unit 5, the DC power is not supplied to the load 3 and the auxiliary power supply 50. Accordingly, a discharge of the auxiliary power supply 50 begins and the step-down transformer 26 steps down a power level, for example, of about 16.8 V of the auxiliary power supply 50 and applies stepped down voltage power Vcc, for example, 12.4 V and current power to the current sensor 28 and the comparator 29 of the voltage supply controller 27. As the current power and voltage power are applied from the step-down transformer 26, the current sensor 28 applies the first sensor voltage, for example, of about 6.7 V to the non-inverting terminal of the operational amplifier 30 through the fourth terminal and outputs the voltage power output from the step-down transformer 26 through the fifth terminal. As the first sensor voltage is applied to the non-inverting terminal, the operational amplifier 30 outputs and applies the voltage power output from the step-down transformer 26 to the second terminal of the relay 22. Accordingly, the relay 22 is changed into a reset latch state. Accordingly, connection between the DC power conversion system 1 and the auxiliary power supply 50 is perfectly cut off.

In a situation 4, when the DC power conversion system 1 is inserted and restored from the situation 3 and the load 3 is not connected to the second connection unit 7, that is, since the DC power is supplied from the DC power conversion system 1 through the first connection unit 5, the relay 22 maintains a set latch state, thereby boosting the DC power supplied form the DC power conversion system 1 by the boosting transformer 25 and charging the auxiliary power supply 50. Since a charging operation occurs and a discharge operation does not occur in the auxiliary power supply 50, current power and voltage power Vcc output from the step-down transformer 26 do not occur. Accordingly, since there is no current power applied to the current sensor 28, the current sensor 28 outputs and applies the second sensor voltage, for example, 6.2 V to the non-inverting terminal of the operational amplifier 30 through the fourth terminal. Due to this, since the operational amplifier 30 outputs 0 V to the second terminal of the relay 22, it is impossible to change the relay 22 from the set latch state into the reset latch state. As a result, in the situation 4, the DC power supplied from the DC power conversion system 1 is supplied to the auxiliary power supply 50.

As described above, exemplary embodiments of the present invention have been described. While the present invention has been particularly shown and described with reference to exemplary embodiments thereof, it will be understood by those of ordinary skill in the art that various changes in form and details may be made therein without departing from the spirit and scope of the present invention as defined by the following claims. Therefore the embodiments described above would be considered in a descriptive way, not in a limitative way. Accordingly, the scope of the present invention is not limited to the embodiments described above and it would be understood to include the contents in the claims and equivalents thereof.

INDUSTRIAL APPLICABILITY

The present invention will be applied to the field of manufacturing uninterruptible direct current (DC) power supply systems which continuously supply DC power to a load.

What is claimed is:

1. An uninterruptible direct current (DC) power supply system which continuously supplies DC power to a load, the uninterruptible DC power supply system comprising:
   a first connection unit electrically connected to a DC power conversion system which converts prevailing AC power into the DC power;
   a second connection unit which is electrically connected to the load and supplies the DC power to the load;
   an auxiliary power supply charged by the DC power; and
   an uninterruptible control unit which supplies the DC power supplied from the DC power conversion system normally connected to the first connection unit to the load through the second connection unit, charges the auxiliary power supply, and controls power to be continuously supplied to the load while perfectly cutting off electrical connection between the DC power conversion system and the auxiliary power supply when the DC power conversion system is disconnected from the first connection unit, is damaged, or short-circuits;
   wherein the uninterruptable control unit comprises a connection controller which comprises a relay connected to the first connection unit, controls connection between the first connection unit and the relay to be cut off when the DC power conversion system is disconnected from the first connection unit, is damaged, or short-circuits, and controls the first connection unit and the relay to be connected to each other when the DC power conversion system is normally connected to the first connection unit.

2. The uninterruptible DC power supply system of claim 1, wherein the uninterruptible control unit comprises:
   a boosting transformer which boosts a level of DC voltage power supplied from the DC power conversion system normally connected to the first connection unit and changes the auxiliary power supply using the boosted DC voltage power;
   a step-down transformer which steps down a level of voltage power of the auxiliary power supply; and
   a power supply controller comprising a current sensor which outputs sensor voltages at different levels depending on whether current power is applied from the step-down transformer and applies voltage power output from the step-down transformer to the load connected to the second connection unit as the current power is applied from the step-down transformer and a comparator which controls the reset latch state of the relay by controlling an output of the voltage power output from the step-down transformer according to the sensor voltages at different levels.

3. The uninterruptible DC power supply system of claim 2, wherein the current sensor outputs a first sensor voltage when the current power is applied from the step-down transformer and outputs a second sensor voltage smaller than the first sensor voltage when the current power is not applied, and wherein the comparator allows the relay to be in the reset latch state by applying the voltage power output from the step-down transformer to the relay when the first sensor voltage is applied and prevents the relay from being in the reset latch state not by applying the voltage power output from the step-down transformer to the relay when the second sensor voltage is applied.

4. The uninterruptible DC power supply system of claim 2, wherein the current sensor is a hall sensor.

5. The uninterruptible DC power supply system of claim 2, wherein the level of the DC voltage power supplied from the DC power conversion system normally connected to the first connection unit is about 12 V, the level of the boosted DC voltage power is about 16.8 V, and the level of the stepped down voltage power is about 12.4 V.

6. The uninterruptible DC power supply system of claim 2, wherein the uninterruptible control unit further comprises a switch which is connected to the auxiliary power supply connected to the step-down transformer and controls connection between the step-down transformer and the auxiliary power supply.

7. The uninterruptible DC power supply system of claim 1, wherein a case in which the DC power conversion system is normally connected to the first connection unit indicates a state in which the DC power normally output from the DC power conversion system is supplied to the first connection unit.

8. The uninterruptible DC power supply system of claim 1, wherein a state in which the DC power conversion system is disconnected from the first connection unit indicates a state in which the DC power conversion system is disconnected from the first connection unit and the DC power normally output from the DC power conversion system is not supplied to the first connection unit.

9. The uninterruptible DC power supply system of claim 1, wherein a state in which the DC power conversion system is damaged indicates a state in which the DC power conversion system does not work and the DC power is not normally output.

10. The uninterruptible DC power supply system of claim 1, wherein a state in which the DC power conversion system short-circuits indicates a state in which an anode and a cathode of the DC power conversion system short-circuit.

* * * * *